United States Patent
Ishiguro et al.

(10) Patent No.: US 6,789,525 B2
(45) Date of Patent: Sep. 14, 2004

(54) FAILURE DIAGNOSIS APPARATUS FOR THROTTLE VALVE ACTUATING DEVICE

(75) Inventors: Tetsuya Ishiguro, Wako (JP); Shusuke Akazaki, Wako (JP); Masahiro Sato, Wako (JP); Eiji Hashimoto, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/612,249

(22) Filed: Jul. 1, 2003

(65) Prior Publication Data

US 2004/0003656 A1 Jan. 8, 2004

(30) Foreign Application Priority Data

Jul. 2, 2002 (JP) .................................... 2002-192861

(51) Int. Cl.⁷ .............................................. F00D 1/00
(52) U.S. Cl. ........................ 123/396; 123/399; 701/99; 73/118.1
(58) Field of Search ................................ 123/396, 399; 73/118.1; 701/99, 101, 103

(56) References Cited

U.S. PATENT DOCUMENTS

| | | | | |
|---|---|---|---|---|
| 5,884,243 A | * | 3/1999 | Taniguchi et al. | 702/183 |
| 6,178,947 B1 | * | 1/2001 | Machida et al. | 123/396 |
| 6,276,331 B1 | * | 8/2001 | Machida et al. | 123/396 |
| 6,336,446 B1 | * | 1/2002 | Isobe et al. | 123/520 |
| 6,450,145 B2 | * | 9/2002 | Machida et al. | 123/396 |

FOREIGN PATENT DOCUMENTS

JP          2538731          7/1996

* cited by examiner

Primary Examiner—John T. Kwon
(74) Attorney, Agent, or Firm—Lahive & Cockfield, LLP; Anthony A. Laurentano (57) ABSTRACT

A failure diagnosis apparatus for a throttle valve actuating device is disclosed. The throttle valve actuating device has an actuator for actuating a throttle valve provided in an intake system of an internal combustion engine and biasing elements for biasing the throttle valve to a predetermined retention opening. A feedback control of the throttle valve is performed so that an opening of the throttle valve coincides with a first predetermined opening. After the throttle valve is controlled to the first predetermined opening, a feedback control of the throttle valve is performed so that an opening of the throttle valve coincides with a second predetermined opening. It is determined that the throttle valve actuating device has failed when the time period during which the opening of the throttle valve remains in a predetermined determination range including the second predetermined opening, is shorter than a predetermined time period when performing the feedback control to the second predetermined opening.

18 Claims, 8 Drawing Sheets

FAILURE DIAGNOSIS APPARATUS FOR THROTTLE VALVE ACTUATING DEVICE

BACKGROUND OF THE INVENTION

The present invention relates to a failure diagnosis apparatus for a throttle valve actuating device having an actuator for actuating a throttle valve provided in an intake system of an internal combustion engine, and more particularly to a failure diagnosis apparatus for a throttle valve actuating device including elastic members for maintaining an opening of the throttle valve at a predetermined retention opening when the throttle valve is not actuated by the actuator.

In a throttle valve actuating device that includes a motor for actuating a throttle valve and is configured so that the throttle valve is maintained at a fully closed position when a current is not supplied to the motor, a method for detecting a failure such that the throttle valve does not normally operate is disclosed in Japanese Patent Publication No. 2538731.

According to this method, it is determined that the throttle valve actuating device fails when the throttle valve opening detected by a throttle valve opening sensor is not in the vicinity of a full-closure opening in the condition where the current supply to the motor is stopped.

In this conventional method, the failure determination is performed in the condition where the current supply to the motor is stopped. In other words, the failure determination is performed in the condition where the throttle valve opening is not controlled. Accordingly, it is necessary to set a threshold for this determination in consideration of variations in characteristics of the throttle valve and the throttle valve opening sensor, so as to increase accuracy of the failure determination. As a result, every time a control unit for the throttle valve actuating device is started, a reference opening must be learned, which may cause a problem of an increase in calculation load on the control unit for performing the failure determination.

SUMMARY OF THE INVENTION

It is accordingly an object of the present invention to provide a failure diagnosis apparatus which can reduce the calculation load on the control unit and perform the failure determination with high accuracy by a relatively simple method.

To achieve the above object, the present invention provides a failure diagnosis apparatus for a throttle valve actuating device (10) having actuating means (6) for actuating a throttle valve (3) provided in an intake system (2) of an internal combustion engine (1) and biasing means (4, 5) for biasing the throttle valve (3) to a predetermined retention opening (THDEF). The failure diagnosis apparatus includes first control means, second control means, and determining means. The first control means performs a feedback control of the throttle valve (3) so that an opening (TH) of the throttle valve (3) coincide with a first predetermined opening (DCCMDMIN, DCCMDRTX). The second control means performs a feedback control of the throttle valve (3) so that the opening (TH) of the throttle valve (3) coincide with a second predetermined opening (DCCMDDFT, DCCMDRET) after the throttle valve (3) is controlled to the first predetermined opening (DCCMDMIN, DCCMDRTX) by the first control means. The determining means determines that the throttle valve actuating device (10) has failed when the time period (CDFTCHK, CRETCHK) during which the opening (TH) of the throttle valve (3) remains in a predetermined determination range (from (DCCMDDFT−DFTSPGOKL) to (DCCMDDFT+DFTSPGOKH), from (DCCMDRET−RETSPGOKL) to (DCCMDRET+RETSPGOKH)) including the second predetermined opening (DCCMDDFT, DCCMDRET), is shorter than a predetermined time period (CDFTCHKOK, CRETCHKOK) during an operation of the second control means.

With this configuration, the throttle valve is first controlled with the feedback control to the first predetermined opening, and is next controlled with feedback control to the second predetermined opening. When the time period during which the opening of the throttle valve remains in the predetermined determination range including the second predetermined opening is shorter than the predetermined time period during the execution of the feedback control to the second predetermined opening, it is determined that the throttle valve actuating device has failed. Thus, the failure determination is performed during the execution of the feedback control of the throttle valve opening. Accordingly, it is not necessary to learn the predetermined determination range, and the failure determination can be performed with high accuracy by a relatively simple method.

Preferably, the predetermined retention opening (THDEF) is an opening at which the engine is operable even when the actuating means (6) stops actuating the throttle valve (3).

With this configuration, the throttle valve opening is maintained at the predetermined retention opening at which the engine is operable even when the actuating means stops actuating the throttle valve. Accordingly, even when the throttle valve actuating device has failed, it is possible to obtain an engine output required for moving a vehicle driven by the engine to a place for repairing.

Preferably, the first predetermined opening is an opening (DCCMDMIN) at which the throttle valve (3) is substantially fully closed, and the second predetermined opening (DCCMDDFT) is less than the predetermined retention opening (THDEF) and greater than the first predetermined opening (DCCMDMIN).

With this configuration, the throttle valve is first controlled with the feedback control to the fully-closed opening, and is next controlled with the feedback control to the second predetermined opening which is less than the predetermined retention opening and greater than the fully-closed opening. In other words, the failure determination is performed while the throttle valve is being controlled with the feedback control in the valve opening direction from the fully-closed opening, so that it is possible to determine abnormality of the biasing means for biasing the throttle valve in the valve opening direction.

Preferably, the first predetermined opening is an opening (DCCMDRTX) which is greater than the predetermined retention opening (THDEF), and the second predetermined opening (DCCMDREY) is greater than the predetermined retention opening (THDEF) and less than the first predetermined opening (DCCMDRTX).

With this configuration, the throttle valve is first controlled with the feedback control to the first predetermined opening which is greater than the predetermined retention opening, and is next controlled with the feedback control to the second predetermined opening which is greater than the predetermined retention opening and less than the first predetermined opening. In other words, the failure determination is performed while the throttle valve is being controlled with the feedback control in the valve closing direction from the first predetermined opening which is greater than the predetermined retention opening, so that it is possible to determine abnormality of the biasing means for biasing the throttle valve in the valve closing direction.

Preferably, the second control means includes limiting means for limiting a control amount (DUT) to be supplied to the actuating means (6) when performing the feedback control to make the opening (TH) of the throttle valve (3) coincide with the second predetermined opening (DCCMDDFT, DCCMDRET).

With this configuration, the control amount to be supplied to the actuating means is limited when performing the feedback control of the throttle valve to the second predetermined opening. If the throttle valve actuating device is normal, the feedback control to the second predetermined opening can be performed even when the control amount is limited. However, if the throttle valve actuating device has failed, the feedback control to the second predetermined opening with a limited control amount cannot be completed, which makes it possible to detect the failure of the throttle valve actuating device.

Preferably, the limiting means limits the control amount (DUT) so that the throttle valve (3) can be controlled to the second predetermined opening (DCCMDDFT, DCCMDRET) when the biasing means (4, 5) is normal, while the throttle valve (3) cannot be controlled to the second predetermined opening (DCCMDDFT, DCCMDRET) when the biasing means (4, 5) is abnormal.

DETAILED DESCRIPTION OF THE PREFERRED EMBODIMENTS

The preferred embodiments of the present invention will be described below with reference to accompanying drawings.

Figure 1:
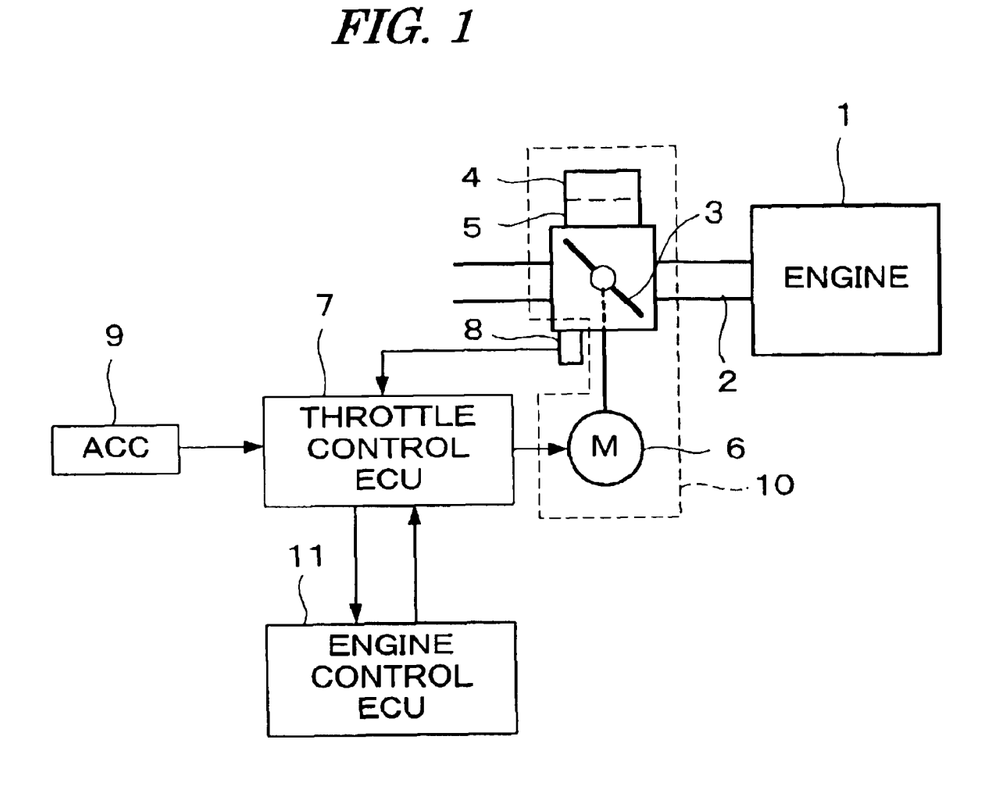
FIG. 1 is a schematic diagram showing a configuration of a throttle valve actuating device and a control unit therefor according to a preferred embodiment of the present invention.

FIG. 1 is a schematic diagram showing the configuration of a throttle valve actuating device and a control unit therefor according to a preferred embodiment of the present invention. An internal combustion engine (hereinafter referred to as "engine") 1 has an intake pipe 2 with a throttle valve 3 disposed therein. The throttle valve 3 is provided with a return spring 4 for biasing the throttle valve 3 in a valve closing direction, and a default spring 5 for biasing the throttle valve 3 in a valve opening direction. The throttle valve 3 can be actuated by a motor 6 as an actuating means through gears (not shown). When the actuating force from the motor 6 is not applied to the throttle valve 3, an opening TH of the throttle valve 3 is maintained at a default opening THDEF (for example, 7.5 degrees) where the biasing force of the return spring 4 balances with a biasing force of the default spring 5. The default opening THDEF is set so that an engine output that is necessary for running the vehicle driven by the engine 1 to a place for repairing, can be obtained, when the actuating force from the motor 6 is not applied to the throttle valve 3.

The motor 6 is connected to an electronic control unit (hereinafter referred to as "ECU") 7 for controlling the throttle valve 3. The operation of the motor 6 is controlled by the ECU 7. The throttle valve 3 is associated with a throttle valve opening sensor 8 for detecting the throttle valve opening TH. A detected signal from the throttle valve opening sensor 8 is supplied to the ECU 7.

Further, the ECU 7 is connected to an acceleration sensor 9 for detecting a depression amount ACC of an accelerator pedal. The depression amount ACC indicates an output demanded by the driver of the vehicle driven by the engine 1. A detected signal from the acceleration sensor 9 is supplied to the ECU 7.

The ECU 7 has an input circuit, an A/D converter, a central processing unit (CPU), a memory circuit, and an output circuit. The input circuit is supplied with detected signals from the throttle valve opening sensor 8 and the acceleration sensor 9. The A/D converter converts input signals into digital signals. The CPU carries out various process operations. The memory circuit has a ROM (read only memory) for storing programs executed by the CPU, and maps and tables that are referred to in the programs, a RAM for storing results of executing programs by the CPU. The output circuit supplies an energizing current to the motor 6. The ECU 7 determines a target opening THCMD of the throttle valve 3 according to the depression amount ACC of the accelerator pedal, determines a control duty (control amount) DUT for the motor 6 so that the detected throttle valve opening TH coincides with the target opening THCMD, and supplies an electric signal according to the control duty DUT to the motor 6. In other words, the ECU 7 performs a feedback control so that the throttle valve opening TH coincides with the target opening THCMD. This feedback control is performed, for example, with a PID (Proportional, Integral, Derivative) control well known in the art.

The throttle valve 3, the return spring 4, the default spring 5, and the motor 6 constitute a throttle valve actuating device 10.

The ECU 7 is connected to an engine control ECU 11 for controlling a fuel amount to be supplied to the engine 1 and an ignition timing of the engine 1. The engine control ECU 11 requests the throttle control ECU 7 to execute failure diagnosis for the throttle valve actuating device 10. The engine control ECU 11 also requests the throttle control ECU 7 not to execute the failure diagnosis when there is a possibility of freezing of the throttle valve 3 due to cold weather.

The failure diagnosis program of the throttle valve actuating device 10 to be executed by the CPU of the ECU 7 will now be described with reference to FIGS. 2 to 8B. This failure diagnosis program is executed at predetermined time intervals (e.g., 2 msec). FIGS. 2 to 7 are flowcharts showing programs for performing the failure diagnosis, FIG. 8A is a time chart for illustrating the failure diagnosis of the default spring 5, and FIG. 8B is a time chart for illustrating the failure diagnosis of the return spring 4. The programs shown in FIGS. 2 to 7 will now be described with reference to FIGS. 8A and 8B.

Figure 2:
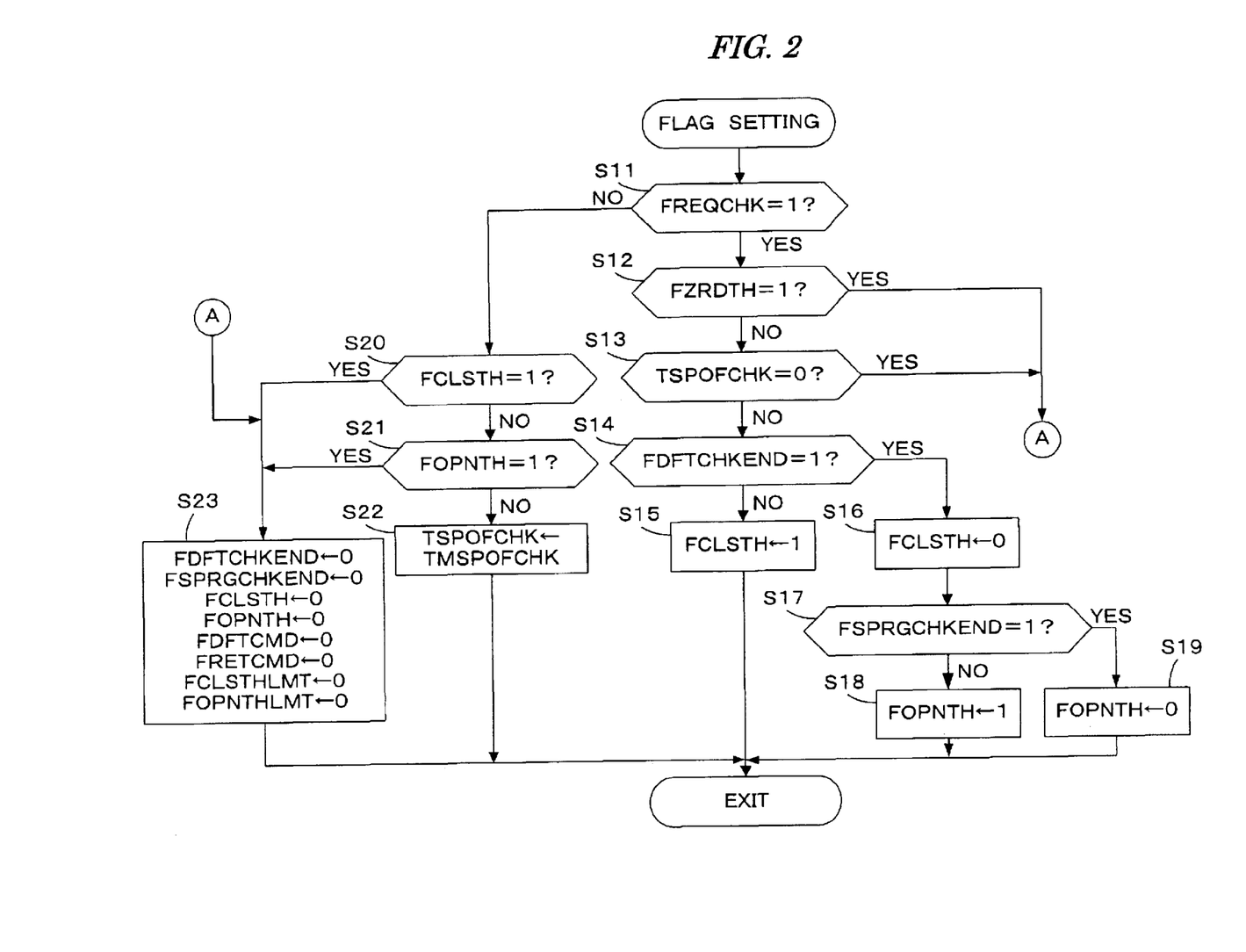
FIG. 2 is a flowchart showing a program for setting various flags used in the failure diagnosis.

FIG. 2 is a flowchart showing a program for setting various flags used in the failure diagnosis.

In step S11, it is determined whether or not a failure diagnosis request flag FREQCHK is "1". The failure diagnosis request flag FREQCHK is set to "1" when a failure diagnosis request is input from the engine control ECU 11. In this preferred embodiment, the failure diagnosis request is input to the ECU 7 when the ignition switch is turned off.

If FREQCHK is "0" in step S11, it is determined whether or not a first check flag FCLSTH is "1" (step S20). The first check flag FCLSTH is set to "1" when the diagnosis of the default spring 5 is performed. Normally, FCLSTH is "0". Accordingly, it is then determined whether or not a second check flag FOPNTH is "1" (step S21). The second check flag FOPNTH is set to "1" when the check of the return spring 4 is performed. Normally, the answer to step S21 is also negative (NO). Accordingly, a downcount timer TSPOFCHK to be referred to in step S13 is set to a predetermined time period TMSPOFCHK (e.g., 10 sec) and then started (step S22).

If the answer to step S20 or step S21 is affirmative (YES) due to any abnormality, the program proceeds to step S23 to initialize various flags. More specifically, a first check end flag FDFTCHKEND, a second check end flag FSPRGCHKEND, the first check flag FCLSTH, the second check flag FOPNTH, a first target opening change flag FDFTCMD, a second target opening change flag FRETCMD, a first limit change flag FCLSTHLMT, and a second limit change flag FOPNTHLMT are all set to "0".

When the failure diagnosis request is input and the failure diagnosis request flag FREQCHK accordingly becomes "1", the program proceeds from step S11 to step S12 to determine whether or not a non-execution request flag FZRDTH is "1". The non-execution request flag FZRDTH is set to "1" when there is a possibility of freezing of the throttle valve 3 because an engine coolant temperature detected by an engine coolant temperature sensor (not shown) connected to the engine control ECU 11 or an intake air temperature detected by an intake air temperature sensor (not shown) connected to the engine control ECU 11 is very low. If the answer to step S12 is affirmative (YES), the program proceeds to step S23, i.e., failure diagnosis is not performed.

If FZRDTH is "0", which indicates that the non-execution request is not input, it is determined whether or not the value of the timer TSPOFCHK started in step S22 is "0" (step S13). If the answer to step S13 remains negative (NO), step S14 and the subsequent steps are executed. First, it is determined whether or not the first check end flag FDFTCHKEND is "1" (step S14). Initially, the answer to step S14 is negative (NO). Accordingly, the first check flag FCLSTH is set to "1" in step S15 (see time t0 in FIG. 8A).

When the diagnosis of the default spring 5 is thereafter completed and the first check end flag FDFTCHKEND is set to "1" (see time t3 in FIG. 8A), the program proceeds from step S14 to step S16 to return the first check flag FCLSTH to "0". It is then determined whether or not the second check end flag FSPRGCHKEND is "1" (step S17). Initially, FSPRGCHKEND is "0". Accordingly, the second check flag FOPNTH is set to "1" (step S18) (see time t10 in FIG. 8B). When the diagnosis of the return spring 4 is thereafter completed and the second check end flag FSPRGCHKEND is set to "1" (see time t13 in FIG. 8B), the second check flag FOPNTH is returned to "0" (step S19).

When the value of the timer TSPOFCHK becomes "0", the program proceeds from step S13 to step S23 to terminate this failure diagnosis even if the second check end flag FSPRGCHKEND has not become "1".

Figure 3:
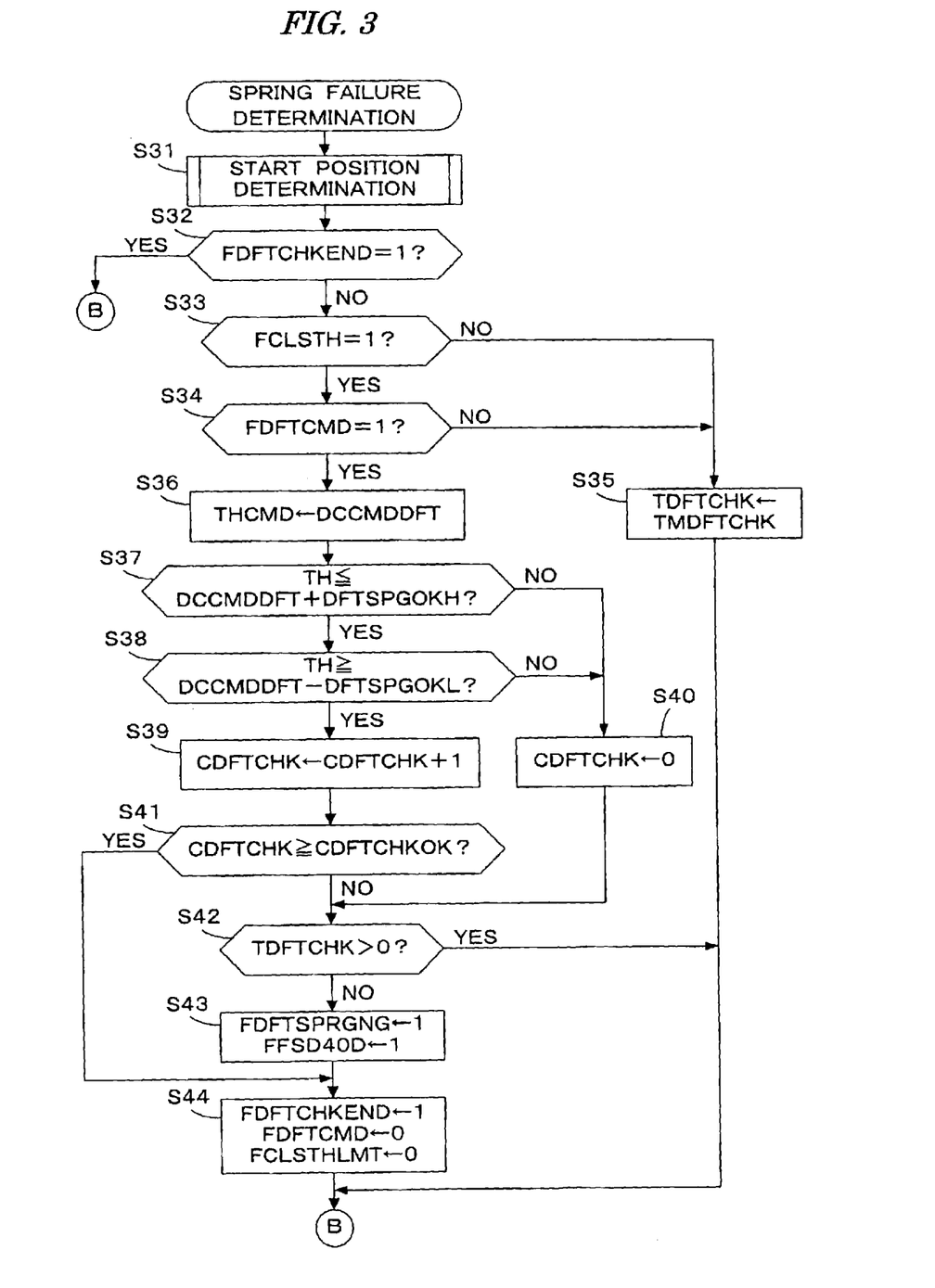
FIGS. 3 and 4 are a flowchart showing a program for diagnosing failure of the throttle valve actuating device.
Figure 4:
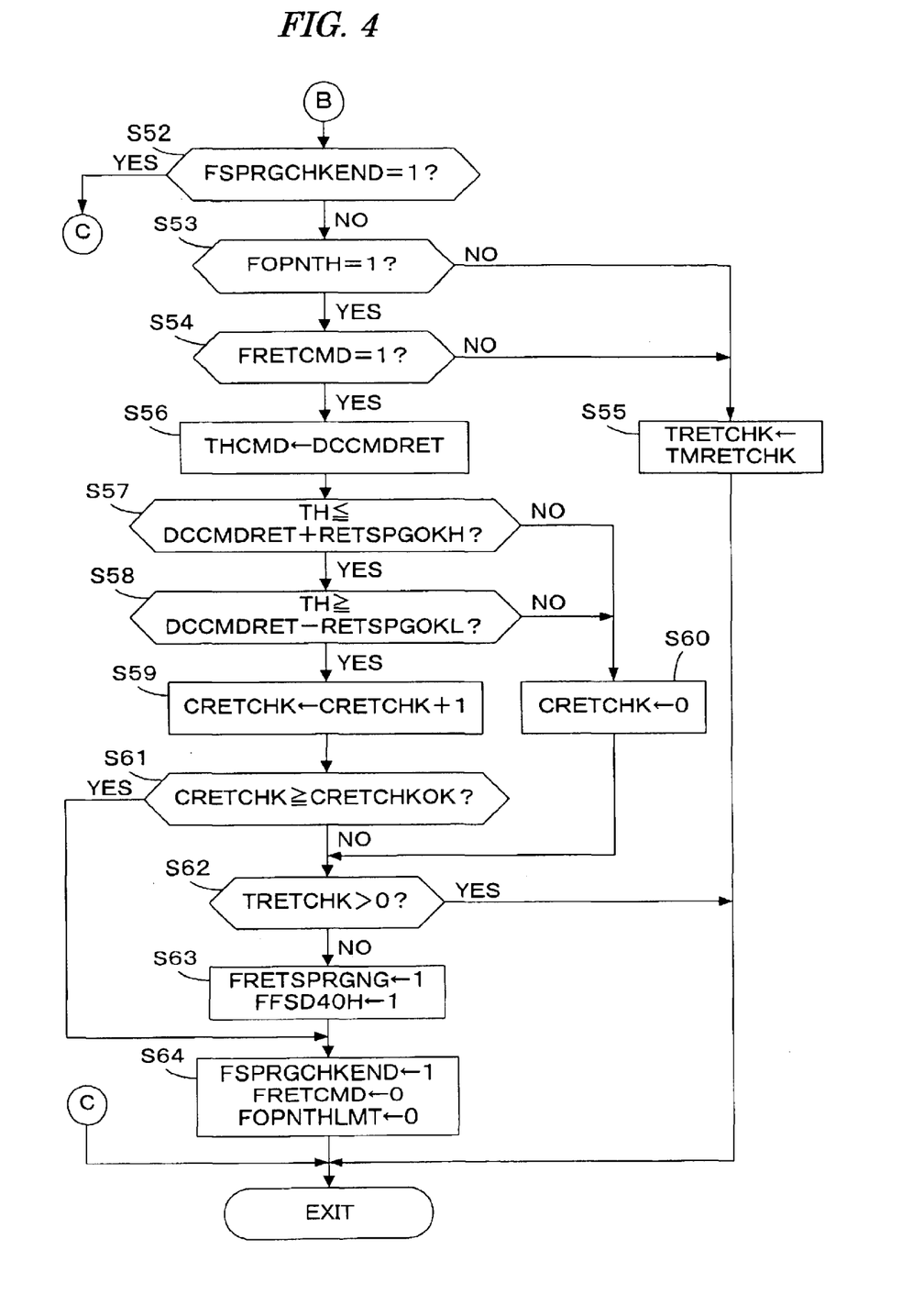

FIGS. 3 and 4 are a flowchart showing a program for diagnosing failure of the default spring 5 and the return spring 4.

Figure 5:
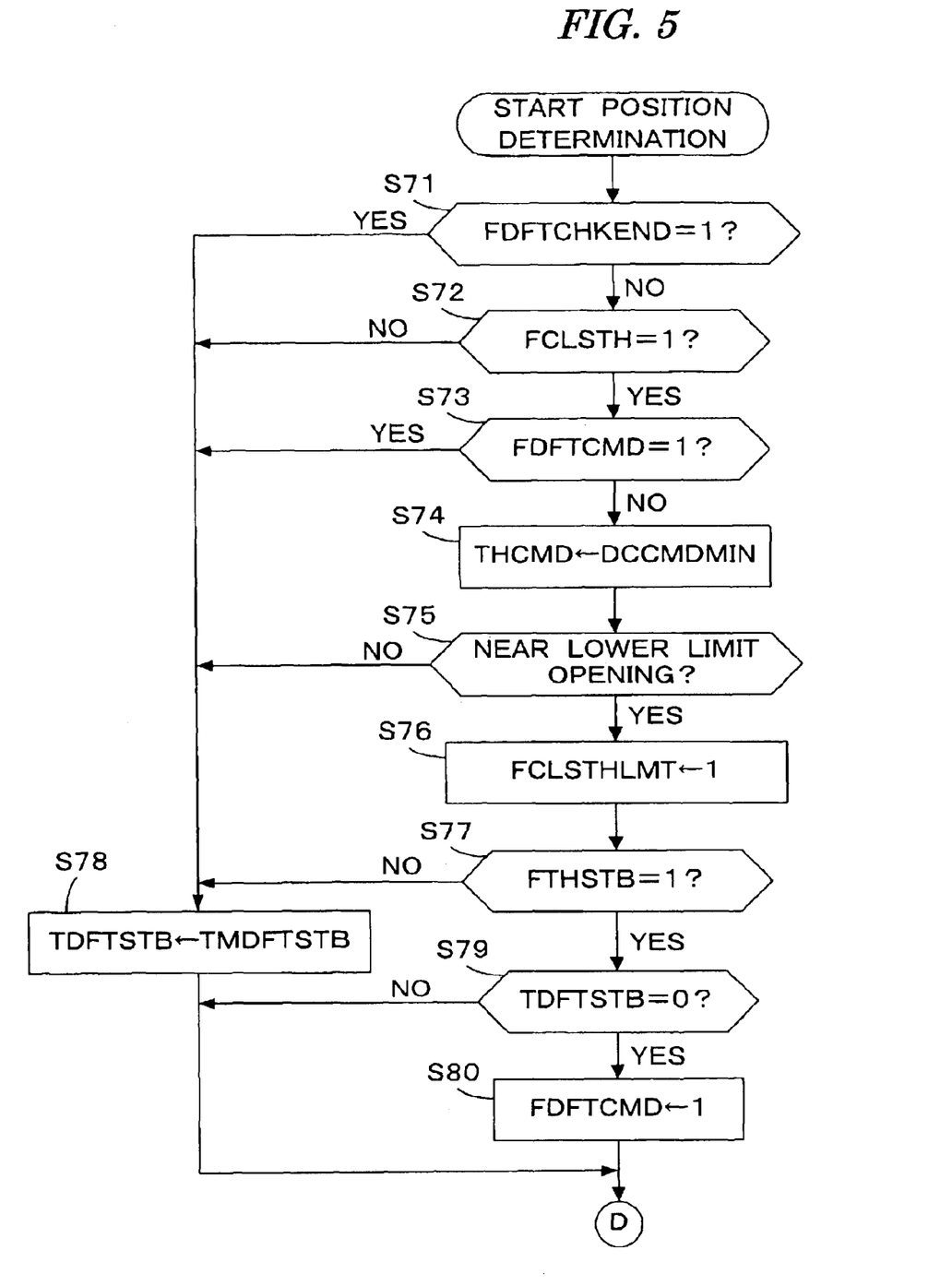
FIGS. 5 and 6 are a flowchart showing a subroutine executed in the program of FIGS. 3 and 4.
Figure 6:
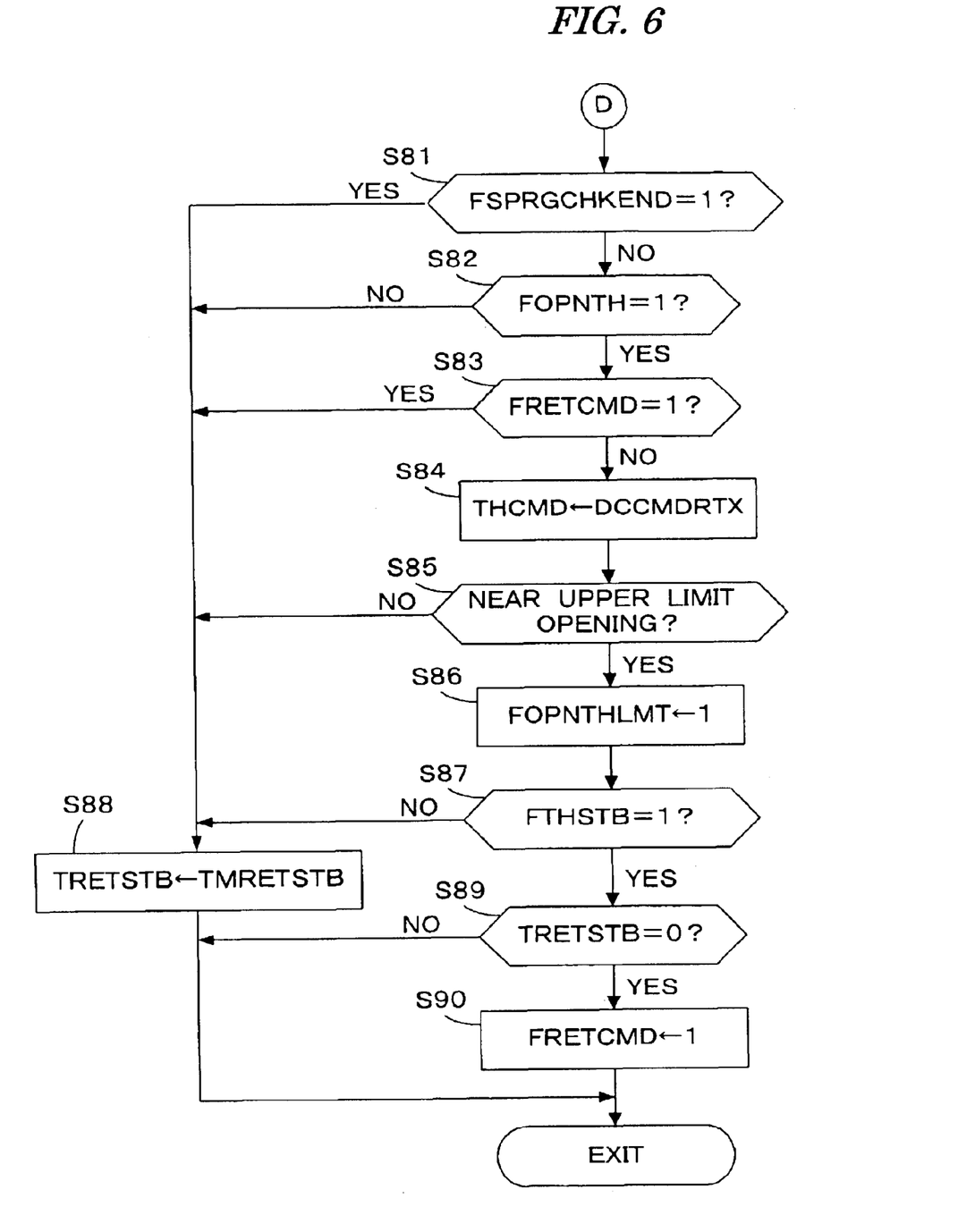

In step S31, a start position determination process shown in FIGS. 5 and 6 is executed. In step S71 shown FIG. 5, it is determined whether or not the first check end flag FDFTCHKEND is "1". Initially, the answer to step S71 is negative (NO). Accordingly, it is determined whether or not the first check flag FCLSTH is "1" (step S72). Initially, the answer to step S72 is negative (NO). Therefore, the program proceeds to step S78 to set a downcount timer TDFTSTB to a predetermined time period TMDFTSTB (e.g., 0.2 sec) and then start the timer TDFTSTB.

When the first check flag FCLSTH is set to "1" (see step S15 in FIG. 2), it is then determined whether or not the first target opening change flag FDFTCMD is "1" (step S73). Initially, FDFTCMD is "0". Accordingly, the program proceeds to step S74 to set the target opening THCMD to a lower limit opening DCCMDMIN (e.g., 0 deg (fully-closed opening)). Accordingly, the feedback control of the throttle valve 3 toward the lower limit opening DCCMDMIN is performed, and the throttle valve 3 is actuated toward the lower limit opening DCCMDMIN.

In step S75, it is determined whether or not the throttle valve opening TH detected by the throttle valve opening sensor 8 has reached an opening (e.g., 0.6 deg or less) near the lower limit opening DCCMDMIN (fully-closed opening). If the answer to step S75 remains negative (NO), the program proceeds to step S78. When the throttle valve opening TH has reached the opening near the lower limit opening DCCMDMIN (see time t1 in FIG. 8A), the first limit change flag FCLSTHLMT is set to "1" (step S76). When the first limit change flag FCLSTHLMT is set to "1", an upper limit DUTYLMTH of the control duty DUT of the motor 6 is changed from a normal upper limit DUTYMAX (e.g., 90%) to a predetermined diagnosis upper limit DCLSLMTH (e.g., −2.5%) (see steps S101 and S102 in FIG. 7). The minus sign of the control duty means a control signal for driving the motor 6 in the direction of closing the throttle valve 3.

In step S77, it is determined whether or not a stability flag FTHSTB is "1". The stability flag FTHSTB is set to "1" when the absolute value of a throttle valve opening change amount DTH (=TH(k)−TH(k−1), where k is a sampling time corresponding to a sampling period) is less than or equal to a predetermined change amount DTHL, and it is detected that the throttle valve opening TH has become stable (substantially constant). If FTHSTB is "0", the program proceeds to step S78. If FTHSTB is "1", which indicates that the throttle valve opening TH has become stable, it is determined whether or not the value of the timer TDFTSTB started in step S78 is "0" (step S79). If the answer to step S79 remains negative (NO), the program proceeds to step S81 (FIG. 6). If the answer to step S79 becomes affirmative (YES) (see time t2 in FIG. 8A), the first target opening change flag FDFTCMD is set to "1" (step S80). When the first target opening change flag FDFTCMD is set to "1", the program proceeds from step S73 through step S78 to step S81 in the following executions of this process. Further, in step S36 shown in FIG. 3, the target opening THCMD is changed to a first predetermined check opening DCCMDDFT (e.g., 3.5 deg).

When the diagnosis of the default spring 5 is completed and the first check end flag FDFTCHKEND is set to "1", the program proceeds from step S71 through step S78 to step S81.

In step S81 shown in FIG. 6, it is determined whether or not the second check end flag FSPRGCHKEND is "1". Initially, the answer to step S81 is negative (NO).

Accordingly, it is determined whether or not the second check flag FOPNTH is "1" (step S82). Initially, the answer to step S82 is negative (NO). Accordingly, the program proceeds to step S88 to set a downcount timer TRETSTB to a predetermined time period TMRETSTB (e.g., 0.2 sec) and then start the timer TRETSTB.

When the second check flag FOPNTH is set to "1" (see step S18 in FIG. 2), it is determined whether or not the second target opening change flag FRETCMD is "1" (step S83). Initially, FRETCMD is "0". Accordingly, the program proceeds to step S84 to set the target opening THCMD to an upper limit opening DCCMDRTX (e.g., 20 deg). Accordingly, the feedback control of the throttle valve 3 toward the upper limit opening DCCMDRTX is performed, and the throttle valve 3 is actuated toward the upper limit opening DCCMDRTX.

In step S85, it is determined whether or not the throttle valve opening TH detected by the throttle valve opening sensor 8 has reached an opening near the upper limit opening (e.g., 20 deg). If the answer to step S85 remains negative (NO), the program proceeds to step S88. When the throttle valve opening TH has reached the opening near the upper limit opening (see time t11 in FIG. 8B), the second limit change flag FOPNTHLMT is set to "1" (step S86). When the second limit change flag FOPNTHLMT is set to "1", a lower limit DUTYLMTL of the control duty DUT of the motor 6 is changed from a normal lower limit DUTYMIN (e.g., −90%) to a predetermined diagnosis lower limit DOPNLMTL (e.g., 2.5%) (see steps S104 and S105 in FIG. 7).

In step S87, it is determined whether or not the stability flag FTHSTB is "1". If FTHSTB is "0", the program proceeds to step S88. If FTHSTB is "1", which indicates that the throttle valve opening TH has become stable, it is determined whether or not the value of the timer TRETSTB started in step S88 is "0" (step S89). If the answer to step S89 remains negative (NO), the program immediately ends. If the answer to step S89 becomes affirmative (YES) (see time t12 in FIG. 8B), the second target opening change flag FRETCMD is set to "1" (step S90). When the second target opening change flag FRETCMD is set to "1", the program proceeds from step S83 through step S88 to the end in the following executions of this process. Further, in step S56 shown in FIG. 4, the target opening THCMD is changed to a second predetermined check opening DCCMDRET (e.g., 14 deg).

When the diagnosis of the return spring 4 is completed and the second check end flag FSPRGCHKEND is set to "1", the program proceeds from step S81 through step S88 to the end.

Referring back to FIG. 3, in step S32, it is determined whether or not the first check end flag FDFTCHKEND is "1". Initially, FDFTCHKEND is "0". Accordingly, the program proceeds to step S33 to determine whether or not the first check flag FCLSTH is "1". If FCLSTH is "0", a downcount timer TDFTCHK is set to a predetermined time period TMDFTCHK (e.g., 2.5 sec) and then started (step S35). Thereafter, the program proceeds to step S52 shown in FIG. 4.

When the first check flag FCLSTH is set to "1", the program proceeds to step S34 to determine whether or not the first target opening change flag FDFTCMD is "1". If FDFTCMD is "0", the program proceeds to step S35. If FDFTCMD is "1" (see time t2 in FIG. 8A), the target opening THCMD is set to the first predetermined check opening DCCMDDFT (step S36). Accordingly, the feedback control of the throttle valve 3 toward the first predetermined check opening DCCMDDFT is started.

It is next determined whether or not the throttle valve opening TH is less than or equal to a value obtained by adding an upper range setting value DFTSPGOKH (e.g., 2 deg) to the first predetermined check opening DCCMDDFT (step S37). If the answer to step S37 is affirmative (YES), it is further determined whether or not the throttle valve opening TH is greater than or equal to a value obtained by subtracting a lower range setting value DFTSPGOKL (e.g., 2 deg) from the first predetermined check opening DCCMDDFT (step S38).

If the answer to step S37 or S38 is negative (NO), the value of a first check counter CDFTCHK is reset to "0" (step S40) and the program proceeds to step S42. If the answers to steps S37 and S38 are both affirmative (YES), the first check counter CDFTCHK is incremented by "1" (step S39), and it is then determined whether or not the value of the first check counter CDFTCHK is greater than or equal to a first predetermined count value CDFTCHKOK (e.g., 100) (step S41). Initially, the answer to step S41 is negative (NO). Accordingly, the program proceeds to step S42 to determine whether or not the value of the timer TDFTCHK started in step S35 is greater than "0". Initially, the answer to step S42 is affirmative (YES). Accordingly, the program proceeds directly to step S52 (FIG. 4).

When CDFTCHK becomes greater than or equal to CDFTCHKOK in step S41, it is determined that the default spring 5 is normal, and the program proceeds to step S44 to set the first check end flag FDFTCHKEND to "1" and return the first target opening change flag FDFTCMD and the first limit change flag FCLSTHLMT to "0". Thereafter, the program proceeds to step S52. After the first check end flag FDFTCHKEND is set to "1", the program proceeds from step S32 directly to step S52.

If the value of the timer TDFTCHK becomes "0" before the answer to step S41 becomes affirmative (YES) (see time t3 in FIG. 8A), it is determined that the default spring 5 is abnormal, and a default spring abnormality determination flag FDFTSPRGNG and a failure detection flag FFSD40D are both set to "1" (step S43).

In step S52 shown in FIG. 4, it is determined whether or not the second check end flag FSPRGCHKEND is "1". Initially, FSPRGCHKEND is "0". Accordingly, the program proceeds to step S53 to determine whether or not the second check flag FOPNTH is "1". If FOPNTH is "0", a downcount timer TRETCHK is set to a predetermined time period TMRETCHK (e.g., 2.5 sec) and then started (step S55). Thereafter, this program ends.

When the second check flag FOPNTH is set to "1", the program proceeds to step S54 to determine whether or not the second target opening change flag FRETCMD is "1". If FRETCMD is "0", the program proceeds to step S55. If FRETCMD is "1" (see time t12 in FIG. 8B), the target opening THCMD is set to the second predetermined check opening DCCMDRET (step S56). Accordingly, the feedback control of the throttle valve 3 toward the second predetermined check opening DCCMDRET is started.

Next, it is determined whether or not the throttle valve opening TH is less than or equal to a value obtained by adding an upper range setting value RETSPGOKH (e.g., 3 deg) to the second predetermined check opening DCCMDRET (step S57). If the answer to step S57 is affirmative (YES), it is determined whether or not the throttle valve opening TH is greater than or equal to a value obtained by subtracting a lower range setting value RETSPGOKL (e.g., 3 deg) from the second predetermined check opening DCCMDRET (step S58).

If the answer to step S57 or S58 is negative (NO), the value of a second check counter CRETCHK is reset to "0" (step S60) and the program proceeds to step S62. If the answers in steps S57 and S58 are both affirmative (YES), the second check counter CRETCHK is incremented by "1" (step S59), and it is then determined whether or not the value of the second check counter CRETCHK is greater than or equal to a second predetermined count value CRETCHKOK (e.g., 100) (step S61). Initially, the answer to step S61 is negative (NO). Accordingly, the program proceeds to step S62 to determine whether or not the value of the timer TRETCHK started in step S55 is greater than "0". Initially, the answer to step S62 is affirmative (YES). Accordingly, the program immediately ends.

When CRETCHK becomes greater than or equal to CRETCHKOK in step S61, it is determined that the return spring 4 is normal, and the program proceeds to step S64 to set the second check end flag FSPRGCHKEND to "1" and return the second target opening change flag FRETCMD and the second limit change flag FOPNTHLMT to "0". Thereafter, this program ends. When the second check end flag FSPRGCHKEND is set to "1", the program proceeds from step S52 directly to the end.

If the value of the timer TRETCHK becomes "0" before the answer to step S61 becomes affirmative (YES) (see time t13 in FIG. 8B), it is determined that the return spring 4 is abnormal, and a return spring abnormality determination flag FRETSPRGNG and a failure detection flag FFSD40H are both set to "1" (step S63).

Figure 7:
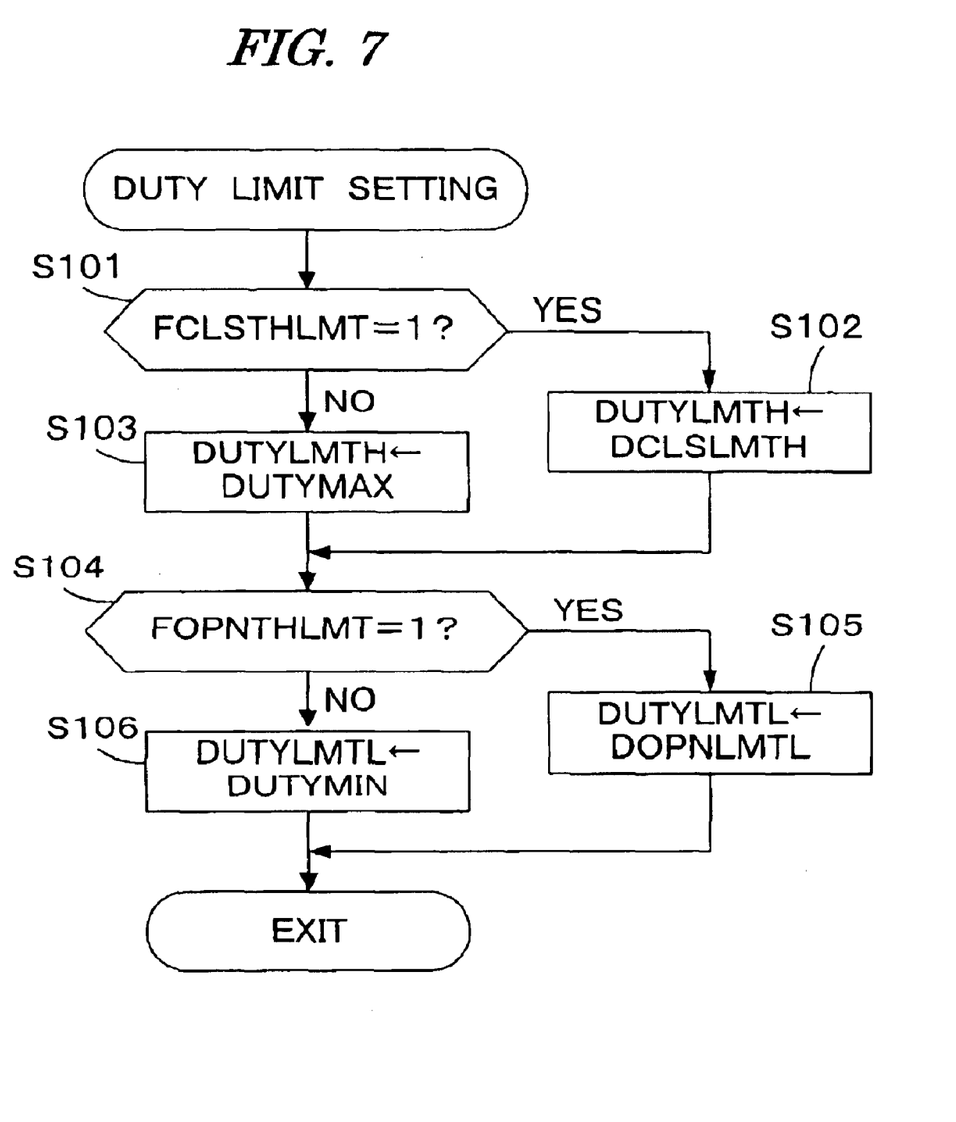
FIG. 7 is a flowchart showing a program for setting limit values of a control amount (DUT) to be supplied to a motor.
Figure 8A:
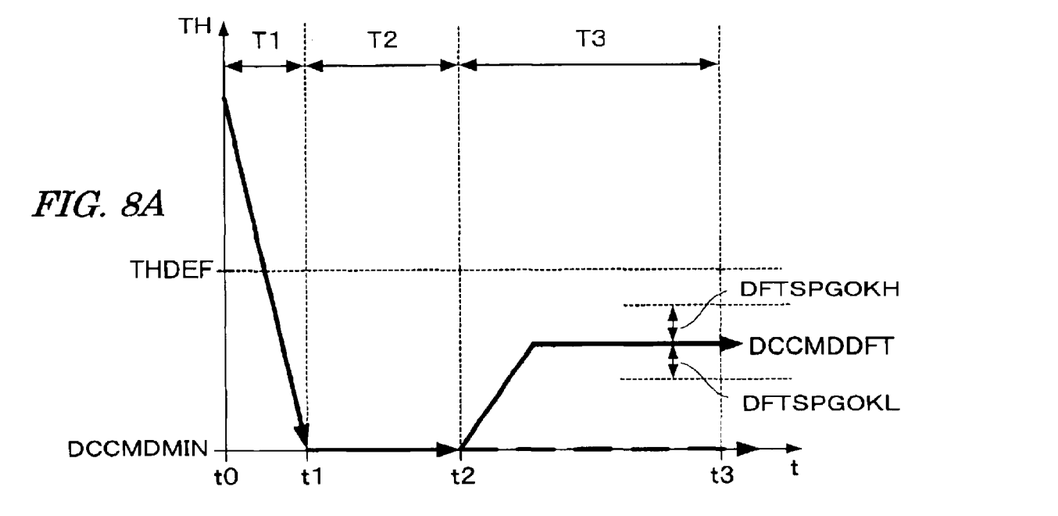
FIGS. 8A and 8B are time charts for illustrating a failure diagnosis method.
Figure 8B:
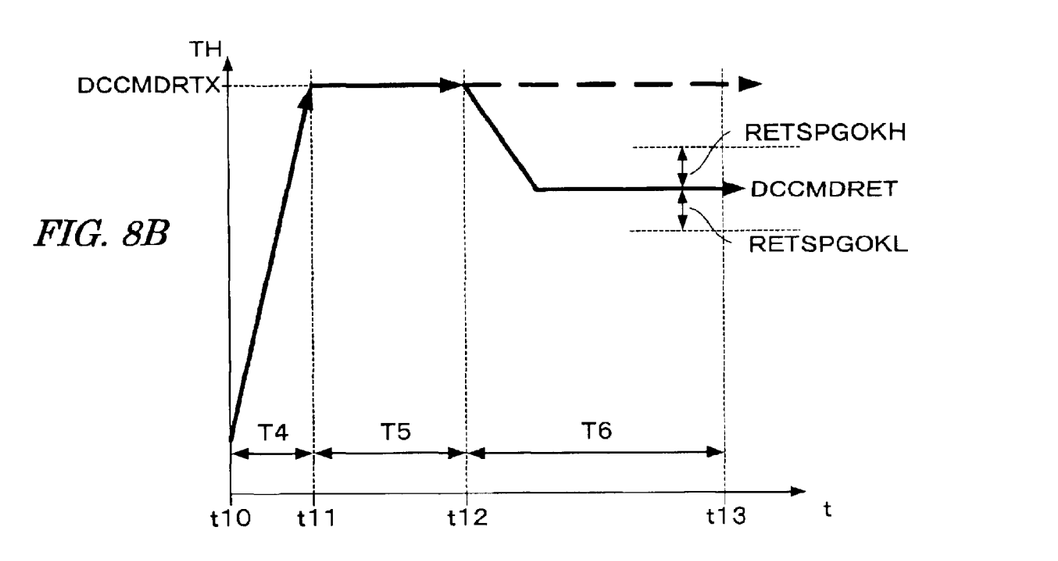

FIG. 7 is a flowchart showing a program for setting the upper limit DUTYLMTH and the lower limit DUTYLMTL of the control duty DUT of a control signal to be supplied to the motor 6.

In step S101, it is determined whether or not the first limit change flag FCLSTHLMT is "1". If FCLSTHLMT is "0", the upper limit DUTYLMTH is set to a maximum value DUTYMAX (e.g., 90%) (step S103). When the first limit change flag FCLSTHLMT is set to "1" in step S76 shown in FIG. 5, the upper limit DUTYLMTH is set to a predetermined diagnosis upper limit DCLSLMTH (e.g., −2.5%) (step S102).

In step S104, it is determined whether or not the second limit change flag FOPNTHLMT is "1". If FOPNTHLMT is "0", the lower limit DUTYLMTL is set to a minimum value DUTYMIN (e.g., −90%) (step S106). When the second limit change flag FOPNTHLMT is set to "1" in step S86 shown in FIG. 6, the lower limit DUTYLMTL is set to a predetermined diagnosis lower limit DOPNLMTL (e.g., 2.5%) (step S105).

FIG. 8A is a time chart showing changes in the throttle valve opening TH to illustrate the diagnosis process of the default spring 5. The target opening THCMD is first set to the lower limit opening DCCMDMIN (time t0) when a failure diagnosis request is input into the ECU 7, and the throttle valve opening TH is controlled with the feedback control to the default spring check starting opening, i.e., the lower limit opening (fully-closed opening) DCCMDMIN. When the throttle valve opening TH reaches the lower limit opening DCCMDMIN (time t1), the first limit change flag FCLSTHLMT is set to "1" (see FIG. 5, step S76). Accordingly, the upper limit DUTYLMTH of the control duty DUT of the motor 6 is changed to the predetermined diagnosis upper limit DCLSLMTH (see FIG. 7, steps S101 and S102). The CPU of the ECU 7 waits until the throttle valve opening TH becomes stable at the lower limit opening DCCMDMIN. When the throttle valve opening TH becomes stable at the lower limit opening DCCMDMIN (time t2), the target opening THCMD is changed to the first predetermined check opening DCCMDDFT (see FIG. 5, step S80 and FIG. 3, steps S34 and S36). Accordingly, the throttle valve opening TH is controlled with the feedback control to the first predetermined check opening DCCMDDFT under the condition where the upper limit DUTYLMTH of the control duty DUT is limited to the predetermined diagnosis upper limit DCLSLMTH. If the default spring 5 is normal, the throttle valve opening TH can be controlled with the feedback control to the first predetermined check opening DCCMDDFT even if the upper limit of the control duty DUT is limited. On the other hand, if the default spring 5 is abnormal and a biasing force for biasing the throttle valve 3 in the valve opening direction is therefore not applied, the throttle valve opening TH cannot be controlled to the first predetermined check opening DCCMDDFT. As a result, the throttle valve opening TH does not stay in a predetermined determination range [in the range from (DCCMDDFT−DFTSPGOKL) to (DCCMDDFT+DFTSPGOKH)] shown in FIG. 8A for a predetermined time period or more (the value of the counter CDFTCHK does not reach the first predetermined count value CDFTCHKOK). Accordingly, it is determined that the default spring 5 is abnormal (the throttle valve opening TH remains at the lower limit opening DCCMDMIN as shown by a broken line in FIG. 8A, for example).

In FIG. 8A, time periods T1, T2, and T3 are 0.5 sec, 0.2 sec, and 2.5 sec, respectively, for example. During the time period from time t0 to time t1, the feedback control is performed so that the throttle valve 3 moves in the closing direction. This movement is performed, for example, at a rate of about −0.4 deg per 2 msec.

When the diagnosis of the default spring 5 is completed, the diagnosis of the return spring 4 is started. FIG. 8B is a time chart showing changes in the throttle valve opening TH to illustrate the diagnosis process of the return spring 4. The target opening THCMD is first set to the upper limit opening DCCMDRTX (time t10), and the throttle valve opening TH is controlled with the feedback control to the return spring check starting opening, i.e., the upper limit opening DCCMDRTX. When the throttle valve opening TH reaches the upper limit opening DCCMDRTX (time t11), the second limit change flag FOPNTHLMT is set to "1" (see FIG. 6, step S86). Accordingly, the lower limit DUTYLMTL of the control duty DUT of the motor 6 is changed to the predetermined diagnosis lower limit DOPNLMTL (see FIG. 7, steps S104 and S105). The CPU of the ECU 7 waits until the throttle valve opening TH becomes stable at the upper limit opening DCCMDRTX. When the throttle valve opening TH becomes stable at the upper limit opening DCCMDRTX (time t12), the target opening THCMD is changed to the second predetermined check opening DCCMDRET (see FIG. 6, step S90 and FIG. 4, steps S54 and S56). Accordingly, the throttle valve opening TH is controlled with the feedback control to the second predetermined check opening DCCMDRET under the condition where the lower limit DUTYLMTL of the control duty DUT is limited to the predetermined diagnosis lower limit DOPNLMTL. If the return spring 4 is normal, the throttle valve opening TH can be controlled with feedback control to the second predetermined check opening DCCMDRET even if the lower limit of the control duty DUT is limited. On the other hand, if the return spring 4 is abnormal and a biasing force for biasing the throttle valve 3 in the valve closing direction is therefore not applied, the throttle valve opening TH cannot be controlled to the second predetermined check opening DCCM- DRET. As a result, the throttle valve opening TH does not stay in a predetermined determination range [in the range from (DCCMDRET RETSPGOKL)–to (DCCMDRET+ RETSPGOKH)] shown in FIG. 8B for a predetermined time period or more (the value of the counter CRETCHK does not reach the second predetermined count value CRETCHKOK). Accordingly, it is determined that the return spring 4 is abnormal (the throttle valve opening TH remains at the upper limit opening DCCMDRTX as shown by a broken line in FIG. 8B, for example).

In FIG. 8B, time periods T4, T5, and T6 are 0.5 sec, 0.2 sec, and 2.5 sec, respectively, for example. During the time period from the time t10 to the time t11, the feedback control is performed so that the throttle valve 3 moves in the opening direction. This movement is performed, for example, at a rate of about 0.4 deg per 2 msec.

In this embodiment, the motor 6 corresponds to the actuating means, and the return spring 4 and the default spring 5 correspond to the biasing means. The ECU 7 constitutes the first control means, the second control means, and the determining means. More specifically, the process of FIGS. 5 and 6 corresponds to the first control means, steps S33, S34, and S36 in FIG. 3 and steps S53, S54, and S56 in FIG. 4 correspond to the second control means, and steps S35 and S37 to S43 in FIG. 3 and steps S55 and S57 to S63 in FIG. 4 correspond to the determining means. The process of FIG. 7 corresponds to the limiting means.

In the above embodiment, the lower limit opening used in diagnosing the default spring 5 is set to a fully-closed opening. This lower limit opening may be set to an opening which is slightly greater than the fully-closed opening and less than the opening (DCCMDDFT–DFTSPGOKL) shown in FIG. 8A.

Further, the present invention is applicable also to a failure diagnosis of a throttle valve actuating device for a watercraft propulsion engine such as an outboard enigne having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A failure diagnosis apparatus for a throttle valve actuating device having actuating means for actuating a throttle valve provided in an intake system of an internal combustion engine and biasing means for biasing said throttle valve to a predetermined retention opening, said failure diagnosis apparatus comprising:

first control means for performing a feedback control of said throttle valve so that an opening of said throttle valve coincides with a first predetermined opening;

second control means for performing a feedback control of said throttle valve so that the opening of said throttle valve coincides with a second predetermined opening after said throttle valve is controlled to the first predetermined opening by said first control means; and determining means for determining that said throttle valve actuating device has failed when the time period during which the opening of said throttle valve remains in a predetermined determination range including the second predetermined opening, is shorter than a predetermined time period during an operation of said second control means.

2. A failure diagnosis apparatus according to claim 1, wherein the predetermined retention opening is an opening at which said engine is operable even when said actuating means stops actuating said throttle valve.

3. A failure diagnosis apparatus according to claim 2, wherein the first predetermined opening is an opening at which said throttle valve is substantially fully closed, and the second predetermined opening is less than the predetermined retention opening and greater than the first predetermined opening.

4. A failure diagnosis apparatus according to claim 2, wherein the first predetermined opening is an opening which is greater than the predetermined retention opening, and the second predetermined opening is greater than the predetermined retention opening and less than the first predetermined opening.

5. A failure diagnosis apparatus according to claim 1, wherein said second control means includes limiting means for limiting a control amount to be supplied to said actuating means when performing the feedback control to make the opening of said throttle valve coincide with the second predetermined opening.

6. A failure diagnosis apparatus according to claim 5, wherein said limiting means limits the control amount so that said throttle valve can be controlled to the second predetermined opening when said biasing means is normal, while said throttle valve cannot be controlled to the second predetermined opening when said biasing means is abnormal.

7. A failure diagnosis method for a throttle valve actuating device having an actuator for actuating a throttle valve provided in an intake system of an internal combustion engine and biasing members for biasing said throttle valve to a predetermined retention opening, said failure diagnosis method comprising the steps of:

a) performing a feedback control of said throttle valve so that an opening of said throttle valve coincides with a first predetermined opening;

b) performing a feedback control of said throttle valve so that the opening of said throttle valve coincides with a second predetermined opening after said throttle valve is controlled to the first predetermined opening; and c) determining that said throttle valve actuating device has failed when the time period during which the opening of said throttle valve remains in a predetermined determination range including the second predetermined opening, is shorter than a predetermined time period when performing the feedback control in said step b).

8. A failure diagnosis method according to claim 7, wherein the predetermined retention opening is an opening at which said engine is operable even when actuation of said throttle valve is stopped.

9. A failure diagnosis method according to claim 8, wherein the first predetermined opening is an opening at which said throttle valve is substantially fully closed, and the second predetermined opening is less than the predetermined retention opening and greater than the first predetermined opening.

10. A failure diagnosis method according to claim 8, wherein the first predetermined opening is an opening which is greater than the predetermined retention opening, and the second predetermined opening is greater than the predetermined retention opening and less than the first predetermined opening.

11. A failure diagnosis method according to claim 7, wherein a control amount to be supplied to said actuator is limited when performing the feedback control to make the opening of said throttle valve coincide with the second predetermined opening in said step b).

12. A failure diagnosis method according to claim 11, wherein the control amount to be supplied to said actuator is limited so that said throttle valve can be controlled to the second predetermined opening when said biasing means is normal, while said throttle valve cannot be controlled to the second predetermined opening when said biasing means is abnormal.

13. A computer program for causing a computer to carry out a failure diagnosis method for a throttle valve actuating device having an actuator for actuating a throttle valve provided in an intake system of an internal combustion engine and biasing members for biasing said throttle valve to a predetermined retention opening, said failure diagnosis method comprising the steps of:

a) performing a feedback control of said throttle valve so that an opening of said throttle valve coincides with a first predetermined opening;

b) performing a feedback control of said throttle valve so that the opening of said throttle valve coincides with a second predetermined opening after said throttle valve is controlled to the first predetermined opening; and c) determining that said throttle valve actuating device has failed when the time period during which the opening of said throttle valve remains in a predetermined determination range including the second predetermined opening, is shorter than a predetermined time period when performing the feedback control in said step b).

14. A computer program according to claim 13, wherein the predetermined retention opening is an opening at which said engine is operable even when actuation of said throttle valve is stopped.

15. A computer program according to claim 14, wherein the first predetermined opening is an opening at which said throttle valve is substantially fully closed, and the second predetermined opening is less than the predetermined retention opening and greater than the first predetermined opening.

16. A computer program according to claim 14, wherein the first predetermined opening is an opening which is greater than the predetermined retention opening, and the second predetermined opening is greater than the predetermined retention opening and less than the first predetermined opening.

17. A computer program according to claim 13, wherein a control amount to be supplied to said actuator is limited when performing the feedback control to make the opening of said throttle valve coincide with the second predetermined opening in said step b).

18. A computer program according to claim 17, wherein the control amount to be supplied to said actuator is limited so that said throttle valve can be controlled to the second predetermined opening when said biasing means is normal, while said throttle valve cannot be controlled to the second predetermined opening when said biasing means is abnormal.

* * * * *